US005490664A

United States Patent [19]

Justus et al.

[11] Patent Number: 5,490,664

[45] Date of Patent: Feb. 13, 1996

[54] UNIVERSAL FORK WIRE HARNESS ASSEMBLY JIG

[75] Inventors: George L. Justus, Northville; Vladimir Karasik, Oak Park, both of Mich.

[73] Assignee: United Technologies Automotive, Inc., Dearborn, Mich.

[21] Appl. No.: 189,377

[22] Filed: Jan. 31, 1994

[51] Int. Cl.[6] .................... B23Q 3/00

[52] U.S. Cl. .................... 269/66; 269/74; 269/310; 269/296; 269/903

[58] Field of Search .................... 269/45, 55, 66, 269/74, 76, 296, 303, 305, 309, 310, 317, 329, 903; 140/92.1; 29/755, 850, 760

[56] References Cited

U.S. PATENT DOCUMENTS

| | | | |
|---|---|---|---|
| 1,211,812 | 1/1917 | Barnes | 269/305 |
| 3,258,039 | 6/1966 | Ewalt . | |
| 3,653,411 | 4/1972 | Mosher . | |
| 3,946,768 | 3/1976 | Fiorentino . | |
| 4,337,934 | 7/1982 | Caveney | 269/903 |
| 4,566,502 | 1/1986 | Kellogg | 269/903 |
| 4,724,612 | 2/1988 | Pearson . | |
| 4,867,207 | 9/1989 | Crawford . | |
| 4,949,944 | 8/1990 | Groff | 269/76 |
| 4,979,544 | 12/1990 | Swindlehurst . | |
| 5,168,904 | 12/1992 | Quinkert . | |
| 5,215,297 | 6/1993 | Sato et al. | 269/74 |
| 5,338,014 | 8/1994 | Kitamura | 269/903 |

*Primary Examiner*—Robert C. Watson

[57] ABSTRACT

A jig is provided which is capable of being selective locked in place to support a work piece and quickly dropped out of place to allow the work in progress to pass by. The jig includes a plurality of fingers which can be selectively configured to support a variety of work pieces. The fingers can be easily reconfigured to handle a variety of work pieces without requiring modification of the basic jig structure.

6 Claims, 4 Drawing Sheets

UNIVERSAL FORK WIRE HARNESS ASSEMBLY JIG

BACKGROUND OF THE INVENTION

1. Technical Field

This invention relates generally to the assembly of wiring harnesses, and more particularly to an apparatus and method for improving the speed and efficiency with which wire harnesses are taped.

2. Discussion of the Related Art

Wire harnesses are large bundles of wire used to interconnect the electrical components of a vehicle to their respective input controls and power source. Various groupings of wires are formed in the process of building a wire harness. Some wires are grouped together because they interconnect devices lying in the same general proximity. Other wires are grouped together because they have similar operating properties, such as being high current conductors versus low current conductors. One of ordinary skill in the art can appreciate that wires can be readily grouped according to a variety of other criteria as well. The wires forming a particular group are bundled, or harnessed, to allow greater ease of assembly into the vehicle.

In the manufacture of wire harnesses for vehicles such as automobiles and aircraft, the wire harnesses have become increasingly complex. The proliferation of electrical devices and control systems has increased the number of wires needed. Further, the need to provide functional circuit protection dictates that certain critical functional circuits be electrically isolated from noncritical functional circuits. This enhances the vehicle's ability to function properly in the event of an electrical component failure but increases the complexity of the wiring task. Conversely, the need to reduce wire harness weight has necessitated interconnecting devices to one another for the purposes of sharing an input control or power source even if the devices themselves are otherwise unrelated. As a result of these completing criteria, wire harnesses often resemble an uprooted tree, with a branching root structure dividing outward in one direction from the main trunk, and with another set of branches dividing out in another direction from the main trunk.

It can be appreciated from the foregoing that the assembly of wire harnesses is a complex task. However, it is often not feasible to fully automate the assembly process due to the number of components and connectors being attached, the variety of harnesses assembled at a single factory and the degree to which wire harnesses vary to accommodate different option packages within a given model vehicle. Therefore, wire harnesses are often clipped, bundled and taped by hand. To ease the manual process of bundling wire harnesses, fixtures known as jigs are used to assist the worker in both separating and holding the wires while they are bundled.

Past jigs have proved less than optimum for several reasons. Previous types of jigs have clamps which must be manually tightened and loosened to raise and lower the jig as the work pieces are processed. This reduces the workers' efficiency because they must stop their assembly operation to clamp and unclamp the jig. It also increases fatigue in the workers because they must reach away from their work surface to operate the jig clamp. Previous jigs also were not flexible enough to accept a wide variety of wire configurations. Fixed tine heads have to be removed and changed to allow the head tine configuration to change. This decreases worker efficiency due to jig down-time during change-over. This also increases production costs because many different fixed tine heads need to be stocked to accommodate the variety of wiring configurations assembled at the plant.

For a jig to be a truly effective aid to a worker assembling a wire harness, the jig must meet several requirements. First, the jig must be easy and quick to use. It should readily lock into place for supporting the work piece without requiring the worker to stop and secure a clamp or locking mechanism, and should be capable of being moved quickly out of place as the assembly process progresses. Also, the jig must be flexible, capable of being readily adapted to deal with many different types of wire harness assembly tasks. Finally, the jig would preferably be made from inexpensive, durable materials to reduce the acquisition and maintenance costs introduced into the assembly process through the use of the jig.

SUMMARY OF THE INVENTION

It is therefore an object of the present invention to provide an apparatus and method for facilitating the bundling of wires and the attachment of wire end connectors and components when assembling a wire harness. The apparatus of the present invention includes a jig which is capable of being selective locked in place to support a work piece and quickly dropped out of place to allow the work in progress to pass by. The jig further includes a plurality of fingers which can be selectively configured to support a variety of work pieces. One advantage of the present invention is that the jig quickly locks into position for supporting a work piece and quickly drops out of position to let the work piece pass by without requiring the operator to manually lock and unlock clamping or latching devices on the jig. Another advantage is that the fingers can be easily reconfigured to handle a variety of work pieces without requiring modification of the basic jig structure. This eliminates the need to store several different jig heads in stock. The jig is also fashioned from durable inexpensive materials, reducing the plant overhead costs associated with the acquisition and maintenance of the jigs.

BRIEF DESCRIPTION OF THE DRAWINGS

Other objects, features and advantages of the present invention can be better understood by referencing the following discussion of the presently preferred embodiment in conjunction with the drawings in which.

DESCRIPTION OF THE PRESENTLY PREFERRED EMBODIMENT

Figure 1:
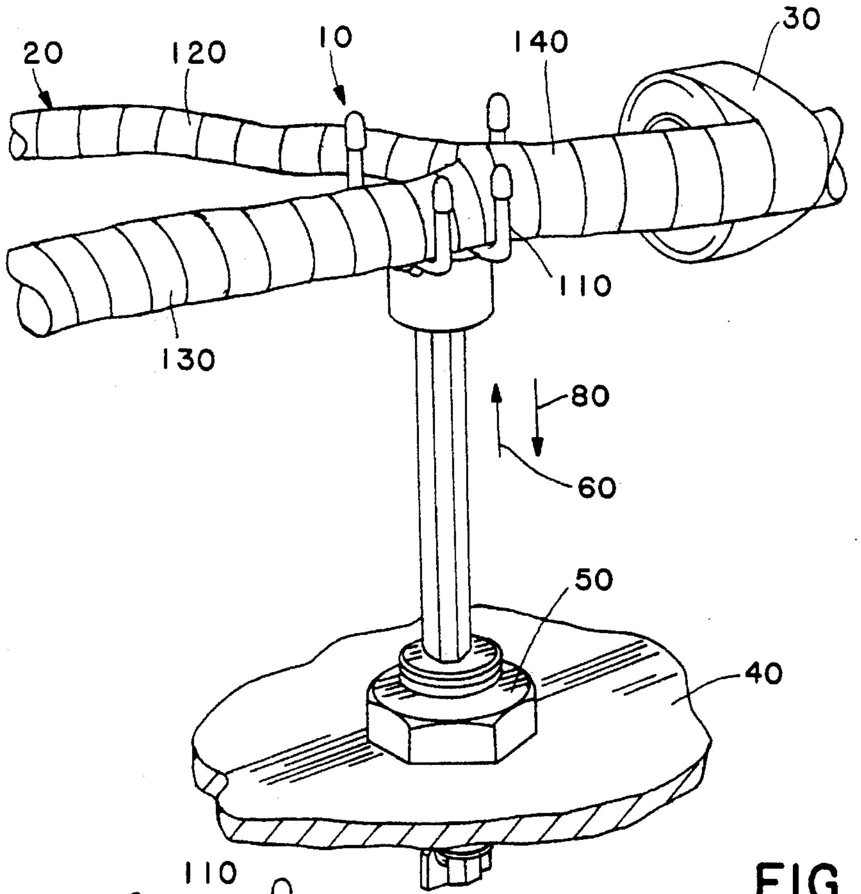
FIG. 1 is an orthogonal view showing how an exemplary section of wiring harness is supported in the jig of the present invention while the harness section is being taped.
Figure 2:
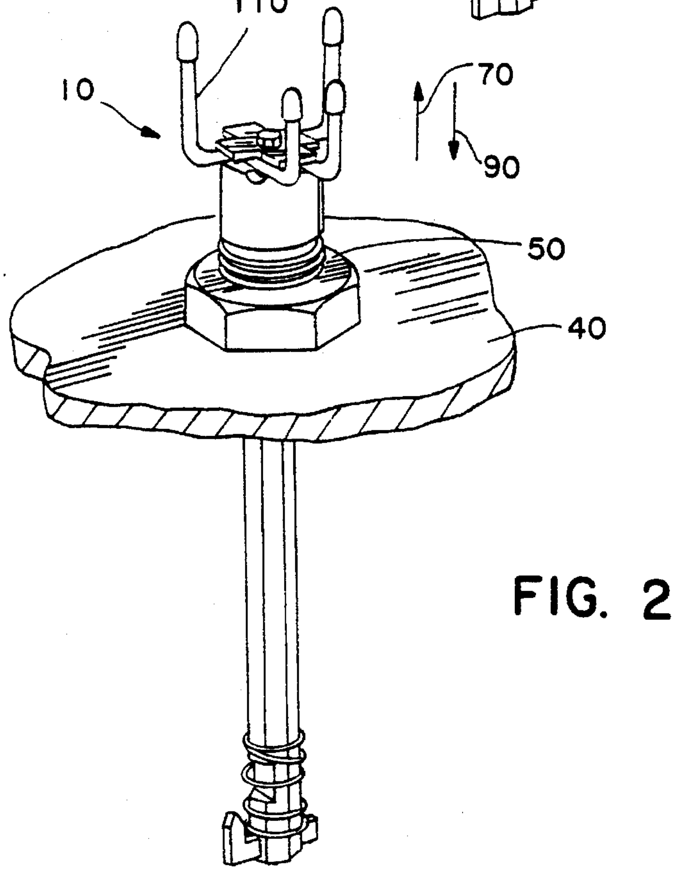
FIG. 2 is an orthogonal view of the jig when it is dropped out of the way to allow work in progress to proceed past the jig.

Referring to FIGS. 1 and 2, the jig of the present invention is shown in use. As shown in FIG. 1, the jig is extended so that the wire fork head 10 supports a wiring harness 20 while its it being taped 30. The jig is mounted to a work table 40 or work surface. As will be discussed later, the jig's mount 50 is adaptable to accommodate work surfaces of varying thicknesses. The jig can be lowered, or "knocked down", out of the way, as shown in FIG. 2, to allow the taped wiring harness to be readily unloaded from the jig upon completion. When a new wiring harness reaches the worker for taping, the jig can be pulled up into the position shown in FIG. 1 to begin taping. Specifically, the jig is raised and lowered by cyclical upward pulls on the jig. To raise the jig, the jig is pulled up through its full travel and released. Once released, the jig relaxes to a position slightly below full travel. To lower the jig, the jig is once again pulled up through its full travel and released. This time, when relaxed, the jig rests at it full retracted position. This is graphically illustrated by arrows 60, 70 for the raising motion, and arrows 80, 90 for the lowering motion.

The wire fork head itself 10 includes one or more adjustable tines, or fingers, 110. These tines can be quickly reconfigured to adapt the wire fork head 10 to support a variety of wiring harness configurations. For example, the line configuration shown in FIGS. 1 and 2 supports a wiring harness 20 having one smaller trunk 120 and one larger trunk 130 branching off from the main trunk 140. Of course, wiring harnesses have many different kinds of branching configurations. Therefore, the ability to quickly reconfigure the tines 110 to accommodate different wiring harness configurations is critical in maximizing the cost-effectiveness of the jig as an assembly aid.

Figure 3:
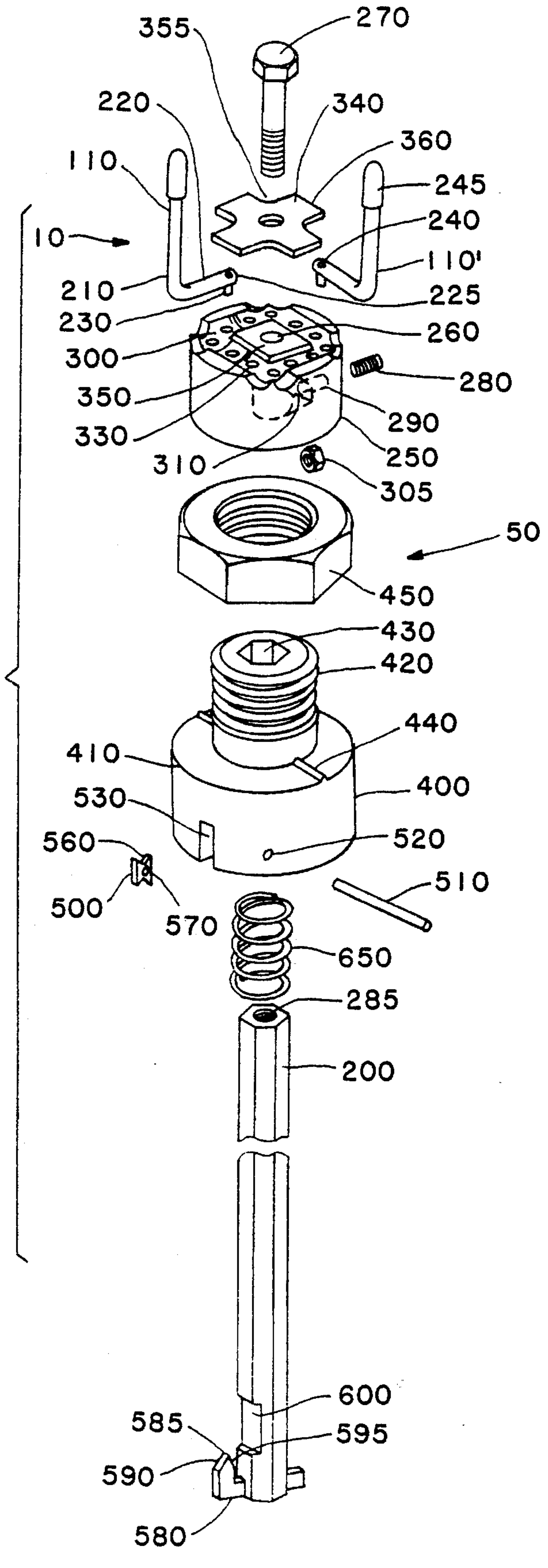
FIG. 3 is an exploded view.

As can be best seen in FIG. 3, the jig includes the wire fork head 10, a mount 50 and a support shaft 200. The wire fork head 10 includes one or more tines 110, 110' that are generally L-shaped. The tines 110, 110' are formed from ¼" cold-rolled steel (CRS) rod and are bent at approximately 90°, with the wire separating finger leg 210 of the L-shaped line 110 being preferably longer than the head mounting leg 220 of the L-shaped line. In this embodiment, line 110 has a separating finger leg 210 approximately two inches in length, with the head mounting leg 220 approximately one inch in length. Looking at the tine 110 as a letter "L", the lower rightmost end 225 of the head mounting leg 220 has a locator pin 230 extending downward. In this embodiment, the locator pin 230 is ⅛" diameter cold-rolled steel rod, approximately ⅜" in length, with approximately ⅛" extending downward from the head mounting leg 220 and the remainder press fit into a locator pin receiving hole 240. The locator pin receiving hole 240 is centered about ⅛" from the rightmost end 225 of the head mounting leg 220 and is ⅛" in diameter. It can be appreciated that the locator pin 230, while press fit in this embodiment, can be welded to the tine 110, in which case the pin would be approximately ⅛" in length and would be simply welded to the head mounting leg 220 approximately ⅛" from the rightmost end 225. It can also be appreciated that the locator pin 230 could simply be formed by extruding. Also, the tine 110 with its locator pin 230 could be made from a formable non-metallic material, such as acrylic plastic. Here, cold rolled steel rod with a press fit locator pin is preferred because the materials are inexpensive and plentiful, and because pressing the pin into place requires fewer tools and less precision than welding the pin into place.

As shown in this view, the wire fork head 10 has two tines 110, 110', however it will be appreciated from this description of the presently preferred embodiment that the wire fork head of this embodiment is adapted to receive from one to four tines. It should be noted that, in this embodiment, the roll stock steel used to form the tines 110, 110' is coated with a rubberizing material to form a protector tip 245. This tip 245 helps reduce the need to cleanly finish the upward facing end of the separating finger leg 210 of the tine 110.

The wire fork head 10 has a base 250 formed from molded polycarbonate plastic. The head base 250 is approximately 1–⅜" diameter and 0.80" thick. The base 250 receives and fixes the tines 110 to form the forked appearance of the wire fork head 10. The center of the head base 250 has a longitudinal passageway 260, through which a ¼"–20 UNC 1–½" long hex head bolt 270 passes. The bolt 270 passes through the base 250 and threads into the support shaft 200. Specifically, the passageway 260 is a ½" countersunk ¼" hole tapped to 0.35" depth, with the countersink facing downward to receive the ½" diameter, 8" long, nickel-plated steel hex rod support shaft 200 and with the ¼" hole end of the passageway 260 receiving the bolt 270. The support shaft is end tapped with a 1–½" depth ¼"–20 UNC thread 285 to engage the hex head bolt 270. There is a set screw 280 which passes through a laterally drilled passage 290 to engage a nut 300. The nut is housed within a nut cavity 310 in the head base 250. In this embodiment, the nut cavity 310 is formed by cutting a slot approximately ⅛" wide and ⅜" across so that the ¼"–20 UNC hex nut 300 is tangential to the radius of the support shaft 200 when placed within the nut cavity. The ½" long #10–32 set screw 280 passes through the 0.19" drilled passage 290, threads into and passes through the nut 300, and applies force against the support shaft 200 to fix the base 250 to the end of the support shaft 200.

The base 250 has four channels 300 formed across its upper surface. The channels 300 have ¼" radius bottoms and are formed in a square pattern parallel to the upper surface of the base 250 so that the distance between the centers of the channels is ¾". Since the channels 300 are the same diameter as the tines 110, the tines can rest comfortably within the channels. Thus, the tines 110 can be located to extend radially from the base 250 in any one of four directions coaxially with the length of the channels. Along the length of the channels 300 are twelve ⅛" locator holes 330: one in each "corner" of the channel intersections, and in sets of two along the intermediate sections of each of the four sides of the square. The locator holes 330 are spaced symmetrically, ¼" apart. The locator holes 330 receive the locator pins 230 of the tines 110 and help to secure the position of the tines 110 within the channels 300. The various manners in which the tines 110 can be placed with respect to the base 250 will be described in greater detail later. A cross-shaped washer 340, which is sandwiched between the hex bolt 270 and the base 250, acts as a locking plate to hold the tines 110 in place within the channels 300. The center face portion 350 of the base 250 is planed down so that it lies 0.05" below the surface grade of the top of the base. This facilitates the washer 340 providing a snug fit against the tines 110 as the hex bolt 270 is tightened through the base 250 into the threaded hole 285 in the support shaft 200. The washer 340 is 1–⅜" in diameter and has four equidistant notches 355 formed around its periphery to leave four ½" width tabs 360. Each notch 255 has a ½" radius. The washer 340 is cross-shaped to allow the tines 110 to be located clear of the washer when the washer is snugged in place.

The base 250, once the set screw 280 is secured, is fixed at the end of the support shaft 200. The hex bolt 270 incidentally serves to further secure the base 250 to the support shaft 200, but its primary purpose is to secure the washer 340 against the tines 110. The support shaft 200 travels longitudinally within the mount assembly 50 to effect the raising and lowering of the jig head 10 with respect to the work surface 40 that was described earlier in conjunction with FIGS. 1 and 2.

The mount assembly 50 includes a bolt-shaped body 400 formed from molded Celcon. The mount body 400 is 2–⅜" long and has a 1–½" diameter ⅞" thick head 410 with a 1"–8 UNC threaded end 420. Through the length of the mount body 400, a hex-shaped passageway 430 is formed. The passageway 430 is approximately 0.446" across from face to face, so that the hex rod support shaft 200 travels freely within the passageway 430 without binding, yet so that the support shaft is sufficiently secure within the passageway to allow for only nominal rotational slop. The mount body head 410 has a pair of V-shaped tabs 440 which help to "grab" the mounting surface 40, which is sandwiched between the head 410 and a 1"–8 UNC zinc-plated hex nut 450. As described here, the work surface must have a hole at least 1" in diameter but not more than 1–½" in diameter to allow the mount 50 to be secured. However, since the length of the threads 420 is 1–¼" long, the work surface 40 can be of any thickness up to at least 1" thick and the mount will still fix securely to the work surface. Thus, the jig can easily mount on any suitable work surface, such as a wood or metal table. To further facilitate secure mounting of the jig to the work surface 40, an optional spring lockwasher 455 (not shown in FIG. 3, but shown later in FIGS. 4–8) can be placed between the nut 450 and the work surface 40. Of course, the actual size of the mount assembly 50 can vary to meet the particular needs of the situation. To mount the jig to the work table, the head base 250 is removed from the end of the support shaft 200 so that the support shaft can be passed through a hole in the work table 40. The jig is positioned such that the mount body 400 passes through the hole in the work table, exposing the threads 420 on the upper side of the work table 40 and leaving the remainder of the body— the base 410—below the work table. The lockwasher 455 and then the hex nut 450 are passed down the support shaft 200 toward the threads 420 of the mount body 400, and the hex nut 450 is snugged to sandwich the work table 40 between the body 400 on one side and the lockwasher 455 and nut 450 on the other side. The wire fork head base 250 can then be secured to the end of the support shaft 200 via the set screw 280, as previously described. Once mounted within the work table 40, it is significant to note that the jig need not be removed to allow the worker to modify the head 10 configuration, as will be described in greater detail later.

The mount assembly 50 houses the raising and lowering locking mechanism. This mechanism includes a star-shaped lock cam 500 which pivots about a pivot pin 510. The pivot pin 510 is fitted within the body base 410 via a ¼" drilled through hole 520 that is offset ⅜" from the center of the body base 410. Perpendicular to the hole 520 is a 0.15" width slot 530 extending from the outer edge of the body base 410 to the hex-shaped passageway 430. The lock cam 500 fits loosely within the slot 530 and is held in place within the slot by the pivot pin 520. The pin 520 is press fit within the body base 410. The lock cam 500 is ¼" wide and ⅜" long, with similar 90° notches 560 at either end. The lock cam 500 has a ¼" hole 570 through its center, through which the pivot pin 510 passes and about which the lock cam 500 rotates.

The support shaft 200 has a pointed L-shaped follower 580 which is press fit at the end of the shaft opposite the fork base 250. The pointed end 585 of the follower 580 is formed symmetrically: the outer and inner edges of the follower 590, 595 are sloped to form an approximate 60° point 585. The follower 580 is slightly less than 1" in length, and is positioned across the end of the support shaft 200 so that the center line of the point 585 lies 0.426" from the centerline of the shaft. This alignment is rather critical, as the follower 580 must engage the lock cam 500 in a certain fashion. Specifically, the follower 580 rotates the lock cam 500 as the lock cam alternately engages and disengages a notch 600 formed in the shaft to allow cyclical raising and lowering of the jig, as will be described in greater detail later. The notch 600 is located ½" from the end of the support shaft 200, is ⅛" deep and is 0.44" wide. The follower 580 overhangs the shaft 200 so that it also serves to provide a flange surface against which a spring 650 provides biasing force.

Figure 4:
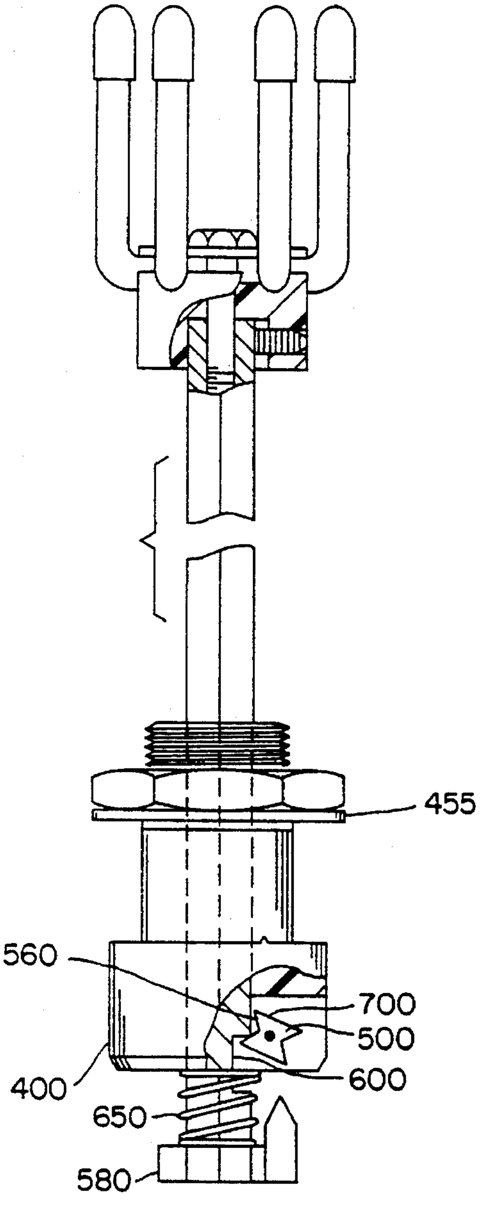
FIGS. 4 through 8 are partial cutaway views showing how the drop out mechanism operates to allow the jig to be locked in place for work and to drop out of place when not in use.
Figure 5:
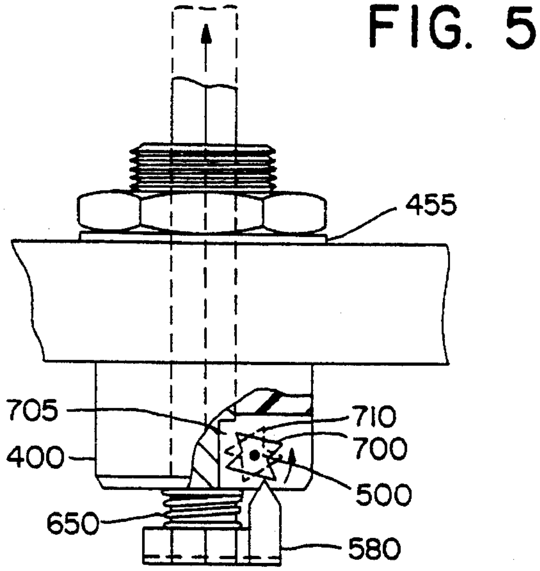
Figure 6:
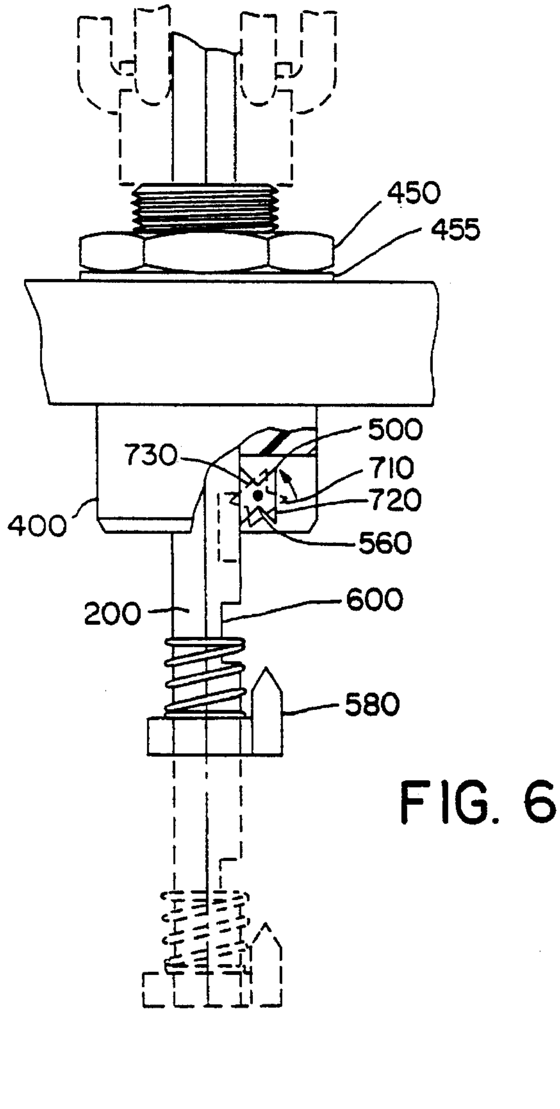
Figure 7:
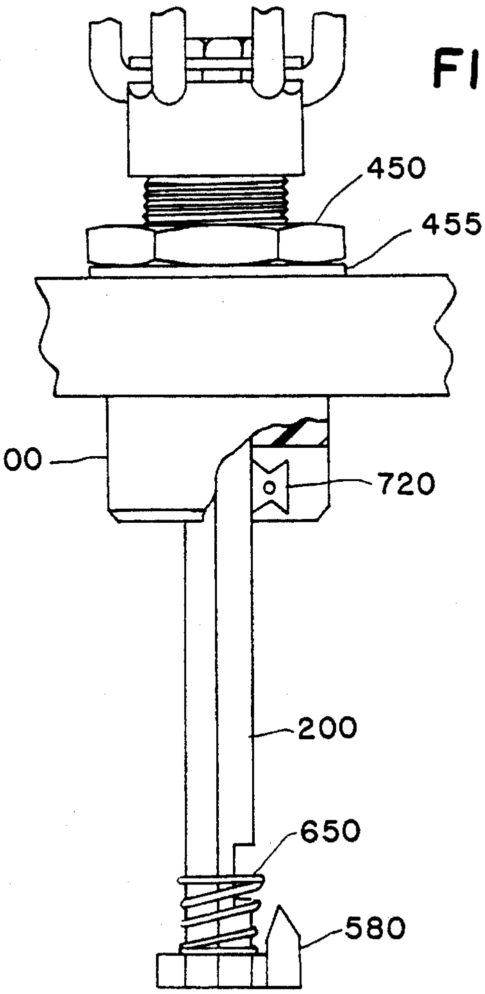
Figure 8:
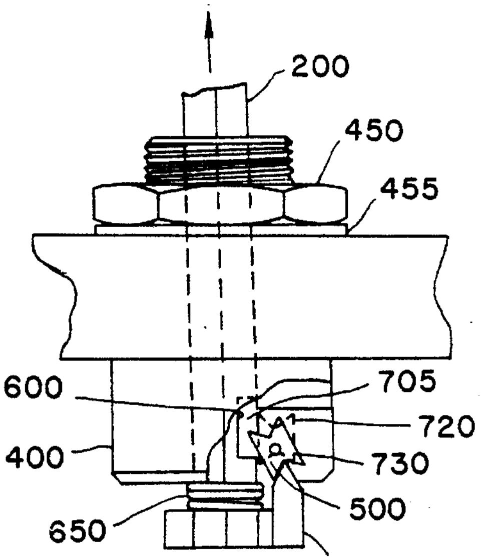

Referring now to FIGS. 4 through 8, the cyclical raising and lowering of the jig occurs as follows. The jig is shown in the raised position in FIG. 4. Here, one of the notches 560 of the lock cam 500 engages the notch 600 formed in the support shaft 200. The spring 650 is slightly compressed between the follower 580 and the mount body 400, and the jig rests slightly below it full upward travel position. To lower the jig, the user grasps the jig, such as by grasping the fork head 10, and tugs upward as shown in FIG. 5. The point 585 of the follower 580 contacts the lock cam 500 while it is in position 700, and causes the lock cam to rotate counterclockwise to position 710 (shown in phantom) within the cavity 705 formed by the movement of the notch 600 with respect to the lock cam 500. The spring 650 is compressed between the follower 580 and the body 400 during this time. Once the worker relaxes his grip on the jig, gravity and the bias force of the spring urge the follower 580 away from the body 400, allowing the lock cam 500 to be contacted by the notch 600 on its return path, which causes the lock cam 500 to rotate from position 710 to position 720 (shown in phantom), as shown in FIG. 6. With the lock cam 500 in position 720, the support shaft 200 slides along the lengthwise edge 730 of the lock cam, helping to hold the lock cam in position 720 without allowing the notch of the shaft 600 to engage the notch of the lock cam 560. With the jig lowered, as shown in FIG. 7, the jig can be raised into position by grasping the jig and pulling upward until the follower 580 contacts the lock cam 500. When pulling the jig upward to lock the mechanism, the lock cam 500 is in position 720. The raising of the jig draws the follower 580 into contact with the lock cam 500, causing the lock cam to rotate counterclockwise within the notch cavity 705 to position 730. During this time the spring 650 is compressed between the follower 580 and the body 400. As the worker relaxes his grip on the jig, the bias force of the compressed spring 650 and gravity urge the follower 580 away from the mount body 400, allowing the shaft notch 600 to contact the lock cam 580 and further rotate it counterclockwise to position 700 as shown in FIG. 4, where it locks the jig in the raised position.

It can be appreciated from the previous discussion that it is very easy for the worker to raise and lower the jig. The worker simply grasps the jig and exerts a slight upward pull to latch and unlatch the lock cam 580 from the shaft notch 600. Because the mount body 400 is formed from a rigid plastic material, the shaft 200 slides freely within the body 400 without binding, further easing the use of the jig. The jig is also rather simple to machine and assembly, since the only truly critical dimension is the location of the lock cam 580 with respect to the follower 580 and the shaft notch 600. Even here, the positioning of the lock cam 580 within the body 400, the position of the follower 580 across the end of the shaft 200, and the position of the shaft within the body passageway 430 can vary by up to 0.002", 0.005", and 0.005", respectively, while still providing positive latching and unlatching between the lock cam 580 and shaft notch 600.

Referring next to FIGS. 9 through 13, the flexibility of the jig to accommodate a wide variety of wiring harness configurations will now be explained. Here, several different configurations of tines 110 within the head base 250 are detailed. It should be appreciated that, while these tine configurations have been set forth to demonstrate the flexibility of the wire fork of the present invention, the tine configurations presented here should in no way be construed as limiting the manner in which the tines and the base can be configured to support work pieces. Also, for the purposes of ease of discussion, the orientation of the tines 110 within the channels, 300 will be described according to which channel the tine lies within (i.e. upper channel, left channel, right channel or lower channel, as viewed as shown in FIGS. 9–13) and according to which locator hole 330 the locator pin 230 of the tine 110 is engaged (i.e. first hole on the left, second hole on the left, second hole on the right or first hole on the right). Recalling the discussion in conjunction with FIG. 3, the tines 110 are held in place on the head base 250 by the washer 340 and hex bolt 270. Thus, to change the configuration of the tines 110, the worker simply needs to loosen and remove the hex bolt 270 to remove the washer 340 and expose the head mounting leg 220 of the tines. The head base 250 need not be removed. This is because the-set screw 280 fixing the head base 250 to the support shaft 200 prevents the head base 250 from becoming accidentally detached from the support shaft 200 while the hex bolt 270 is removed during tine change-over. With the washer 340 and hex bolt 270 removed, the tines 110 can be placed in a number of different configurations.

Figure 9:
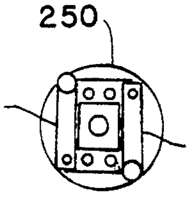
FIGS. 9 through 13 are plan views of the support tines showing exemplary configurations of the support tines, or fingers.
Figure 10:
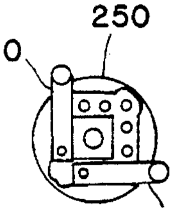
Figure 11:
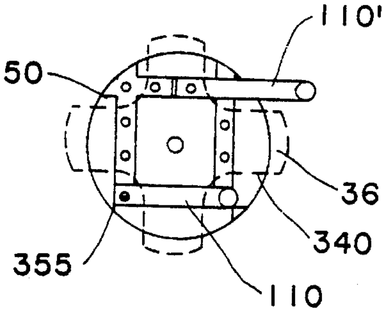

As shown in FIG. 9, two tines 110, 110' are arranged in the base 250, one tine 110 aimed downward with its locator pin engaging the first locator hole from the top along the right side channel, and the other tine 110' aimed upward with its locator pin engaging the first locator hole from the bottom along the left channel. Such a configuration could be used to simply support a bundle of wires that do not need to be separated for taping. Another way of arranging the tines is shown in FIG. 10. Here, two tines 110, 110' are again employed. However, this time they are arranged such that the first tine 110 is aimed upward along the left channel with its locator pin engaging the second locator hole from the top, while the other tine 110' is aimed toward the right along the lower channel with its locator pin engaging the second locator hole from the right. Again, such a configuration could be used to support a bundle of wires that do not need to be separated for taping. Here, though, it can be appreciated that a much larger bundle of wires can be accommodated between the tines as configured in FIG. 10 than as configured in FIG. 9.

It should be noted here that the notches 355 in the washer 340 allow the tines 110 to be secured even when they lie within a radius less than the radius of the base 250 and the washer 340. More specifically, as can be seen in FIG. 9, the tines 110, 110' do not extend past the outer circumference of the head base 250. If the washer 340 did not have the notches 355 formed in it, the washer would interfere with the support legs 210 of the tines 110, 110' and would be prevented from seating against the head mounting legs 220 of the tines to secure the tines in place. It can be appreciated that, since there are four channels 300 in this embodiment, the washer correspondingly needs at least two, and preferably four, notches 355. At least two notches would be required to allow for the configuration shown in FIG. 9, while up to four notches may be needed to accommodate other configurations. It should also be noted that employing a washer simply having a smaller diameter, so that no portion of the washer could interfere with the tines, would be less desirable. This is because the tabs 360 of the presently preferred washer 340 provide means for securing tines that are arranged to extend beyond the circumference of the base 250. This can best be seen by referring to FIG. 11, where a smaller diameter washer 800 would clearly allow the first tine 110 to clear the washer, but would fail to secure the second tine 110' to the base 250. However, with the washer formed as described in this embodiment, the notches 355 allow the first tine 110 to clear the washer, while the tabs 360 still provide sufficient coverage to secure the second tine 110' to the base.

Figure 12:
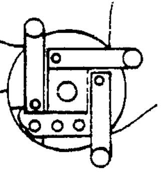
Figure 13:
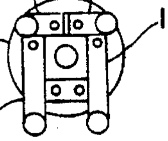

FIGS. 12 and 13 show configurations that include more than two tines, and which are generally used to support wire bundles that need to be separated for taping. FIG. 12 has three tines, with the first tine 110 aimed upward along the left channel with its locator pin engaged in the second locator hole from the bottom, the second tine 110' aimed rightward along the upper channel with its locator pin engaged in the second locator hole from the left, and the third tine 110" aimed downward along the right channel with its locator pin engaged in the second locator hole from the top. This arrangement allows a bundle to be placed in the jig so that the main trunk lies, for example, between the first 110 and third 110" tines, and is separated into two relatively equal bundles between the first 110 and second 110' and between the second 110' and third 110" tines.

The arrangement shown in FIG. 13 has four tines, and details the tine configuration shown earlier in FIGS. 1 through 4. The first and second tines 110, 110' are aimed leftward and rightward, respectively, along the top channel, with their locator pins engaging the second locator hole from the left and right, respectively. The third and fourth tines 110", 110'" are aimed downward along the left and right channels, respectively, with their locator pins engaging the second locator holes from the top. This configuration accommodates, for example, a main trunk bundle between the first and second tines 110, 110', while allowing the main bundle to be separated into smaller bundles between the second and third tines 110', 110", between the third and fourth tines 110", 110'", and between the first and fourth tines 110, 110'". Thus, this configuration allows the main bundle to be split into two or three smaller bundles. As was shown in FIG. 1, the main bundle 140 was laid between the second and third tines, with the smaller bundle branching between the first and second tines and the remainder of the main bundle branching between the fourth and first tines.

As shown in FIG. 13, the tines need not be abutting. Thus, the first and second tines 110, 110' abut, but the third tine 110" and fourth tine 110'" stand alone. Likewise, recalling FIGS. 9 and 10, the tines also stand alone. The tines 110 are retained within the base 250 by virtue of their locator pins 230 engaging the locator holes 330 and by virtue of being sandwiched between the base 250 and the washer 340 by the bolt 270—so whether or not the tines abut one another is irrelevant to the operation of the jig.

The jig of the presently preferred embodiment is capable of adopting a number of different tine orientations as dictated by the needs of the worker. Here, extra tines can simply be stored in a bin next to the worker's station. If the worker desires to modify the configuration of the fork head 10, she simply needs to unscrew the hex bolt 270 to remove the washer 340 and manipulate the tines 110. Thus, the only "extra" parts needed are a total of four tines per work station. This represents a substantial cost savings over a fixed head jig, which would require the stocking of many different fixed heads at each work station. For example, if the worker were required to have fixed heads with tine configurations like those shown in FIGS. 9–13, five different heads per station would need to be stocked. In contrast, using the jig of the presently preferred embodiment, a single head base 250 and four tines 110 would provide all of the configurations detailed—and more—using the same parts. It should also be appreciated that, since the tines 110 and base 250 are constructed from relatively plentiful and inexpensive materials, the costs of replacing lost or damaged parts is also substantially less than the cost of replacing a fixed jig head. Finally, providing the worker with the capability of modifying her own jig head configuration easily and quickly facilitates the worker taking an active role in the management of her wire assembly operation. This is because the worker is free to experiment on the arrangement of the tines to learn the tine configuration that best suits the needs of the task at hand. For example, workers who are more comfortable wrapping the tape from right to left can arrange the tines to split the wire bundle into branches toward the right, while workers who favor working left to right can arrange their tines to split the wire bundle into left-facing branches. If the jig heads were fixed, the "left-handedness" or "right-handedness" of the jig head would force the worker to bundle and split the wires only in one direction.

It can be appreciated that there may be other advantages of the present invention not enumerated in this description. Also, the fact that the presently preferred embodiment shows a base 250 having four channels and shows the use of up to four tines 110 should not be construed to imply that bases having more or fewer channels, or that the use of more or fewer tines, would be unsuitable. Rather, the foregoing description of the presently preferred embodiment was provided for the purposes of illustration, and should not be construed to limit the invention. One of ordinary skill in the art can appreciate that a variety of modifications not described herein may be effected to the invention without departing from the spirit or scope of this invention.

We claim:

1. A jig for supporting a plurality of wires for bundling and taping, the jig comprising:

a head having a base and at least one removable tine, said base having a plurality of channels formed therein adapted to receive said at least one tine and said at least one tine adapted to be received in at least one of said channels and to extend from said base to form a support member by which said plurality of wires are supported for bundling, said tine having a locating means and each of said channels having at least one receptacle for receiving the locating means of said tine whereby said tine rests in at least one of said channels and said locating means is received in one of said at least one receptacle;

a retainer for retaining said at least one tine on the base of said head;

a shaft having a first end upon which said head is removably secured; and a mounting member adapted for mounting said shaft to a work surface, said mounting member further adapted to selectively secure said shaft in a first position and further adapted to selectively release said shaft from said first position to a second position.

2. A jig as set forth in claim 1 wherein said mounting member comprises a mounting base having a shaft passageway formed therethrough through which said shaft slides, said mounting base further having a locking cam pivotally secured therein, and wherein said shaft has a second end to which is affixed a follower and wherein said shaft further has a cam engaging means located between said first and second ends, said locking cam and said follower selectively coacting to alternately engage said cam on said cam engaging means to secure said shaft in said first position and to disengage said cam from said cam engaging means to release said shaft from said first position to said second position.

3. A jig as set forth in claim 1 wherein said retainer is removably secured to the base of said head whereby said tine when secured is received within one of said channels and is sandwiched between the base of said head and said tine retaining means with said locating means received in one of said at least one receptacle of said channel.

4. A jig for assembling a wire harness, said wire harness formed of a plurality of wires which are bundled into groups for routing within a vehicle, said jig comprising:

a head having a base and a plurality of removably securable tines, said base having a plurality of channels formed therein for receiving said tines, said tines extending outward from said base to form a support fork for selectively separating said wires for bundling and for supporting said wires while said wires are being bundled, each of said tines having a locator protrusion thereon and each of said channels having at least one locator dimple, each of said locator protrusions adapted to seat in a respective one of said locator dimples to establish the position of each of said tines with respect to said base;

a shaft having a first end upon which said head is removably secured; and a collar adapted to mount said shaft to a work surface, said collar having a passageway through which said shaft travels between a secured position above said work surface and a relaxed position.

5. A jig as set forth in claim 4 further comprising a tine securing plate for securing said tines to said base, said tine securing plate being removably secured to said base, whereby said tines are received within said channels and are sandwiched between said base and said tine securing plate with each of said locator protrusions seated in a respective one of said locator dimples when said tines are secured to said base by said tine securing plate.

6. A jig as set forth in claim 5 wherein said collar includes a cam pivotally secured therein near said passageway, and wherein said shaft has a second end, opposite said first end, upon which is located a cam follower, and wherein said shaft further has, located between said first and second ends, a cam shoulder, wherein said shaft is held in said secured position when said cam is engaged on said cam shoulder, and wherein said shaft rests at said relaxed position otherwise, wherein said cam follower contacts and rotates said cam when said shaft is pulled upward away from said work surface, wherein a first alternate pulling of said shaft and contacting of said follower with said cam rotates said cam to a first position to engage said cam shoulder and wherein a second alternate pulling of said shaft and contacting of said follower with said cam rotates said cam to a second position to disengage from said cam shoulder and allow said cam shoulder to pass by said cam unimpeded.

* * * * *

UNITED STATES PATENT AND TRADEMARK OFFICE

CERTIFICATE OF CORRECTION

PATENT NO. : 5,490,664

DATED : Feb. 13, 1996

INVENTOR(S) : George L. Justus
Vladimir Karasik

It is certified that error appears in the above-indentified patent and that said Letters Patent is hereby corrected as shown below:

Column 1, line 39: "completing" should be --competing--.

Column 3, line 22: "line" should be --tine--.

Column 3, line 37: "L-shaped line" should be --L-shaped tine--, and "line 110" should be --tine 110--.

Signed and Sealed this

Twenty-first Day of May, 1996

Attest:

BRUCE LEHMAN

*Attesting Officer* — *Commissioner of Patents and Trademarks*